United States Patent

Almasi et al.

[15] 3,691,540

[45] Sept. 12, 1972

[54] INTEGRATED MAGNETO-RESISTIVE SENSING OF BUBBLE DOMAINS

[72] Inventors: George S. Almasi, Purdy Station; Hsu Chang, Yorktown Heights; George E. Keefe, Montrose; David A. Thompson, Somers, all of N.Y.

[73] Assignee: International Business Machines Corporation, Armonk, N.Y.

[22] Filed: Oct. 6, 1970

[21] Appl. No.: 78,531

[52] U.S. Cl. ........................340/174 TF, 340/174 EB

[51] Int. Cl. ..............................................G11c 11/14

[58] Field of Search ..................340/174 TF, 174 EB; 179/100.2 CH

[56] References Cited

UNITED STATES PATENTS

| | | | |
|---|---|---|---|
| 3,530,446 | 9/1970 | Perneski | 340/174 TF |
| 3,493,694 | 2/1970 | Hunt | 340/174.1 F |
| 3,506,975 | 4/1970 | Bobeck et al. | 340/174 TF |
| 3,523,286 | 8/1970 | Bobeck et al. | 340/174 TF |
| 3,256,483 | 7/1966 | Broadbent | 340/174 EB |

*Primary Examiner*—James W. Moffitt
*Attorney*—Hanifin and Jancin and Jackson E. Stanland

[57] ABSTRACT

An integrated magneto-resistive sensor for detection of magnetic bubble domains. The sensor is located on the chip in which the bubble domains propagate and can be an integral part of the propagation circuitry. Any material exhibiting a magneto-resistive effect can be used, and permalloy is a preferred material. The sensing element can be made very small, and has a length which is usually about equal to a bubble domain diameter.

29 Claims, 17 Drawing Figures

INVENTORS
GEORGE S. ALMASI
HSU CHANG
GEORGE E. KEEFE
DAVID A. THOMPSON

BY J. E. Svaland
AGENT

INTEGRATED MAGNETO-RESISTIVE SENSING OF BUBBLE DOMAINS

BACKGROUND OF THE INVENTION

1. Field of the Invention

This invention relates to sensing of magnetic bubble domains, and more particularly to integrated magneto-resistive sensors for detecting bubble domains.

2. Description of the Prior Art

It is well known that a magnetic domain may be bounded by a single wall. Such a domain has a direction of magnetization opposite to that of its surroundings, and a shape which is cylindrical. These domains are described in the Journal of Applied Physics, Vol. 30, pages 217–225, Feb. 1959, in an article entitled "-Domain Behavior in Some Transparent Magnetic Oxides" (R. C. Sherwood et al.).

Devices utilizing these single wall domains, hereinafter referred to as bubble domains, are also known in the prior art. In these devices, propagation circuitry is located on the magnetic sheet in which the bubble domains are nucleated. Under the influence of the propagation circuitry, the bubble domains can be moved throughout the magnetic sheet. Generally, the selective movement of a bubble domain is achieved by generating a localized attracting field at a position which is offset from the position occupied by the bubble domain. Various types of propagation circuitry include conductor loops, permalloy T and I bars, herringbone structures, and angelfish patterns. A description of many of these can be found in the Bell System Technical Journal, Vol. 6, No. 8, Oct. 1967, on pages 1901–1925. In addition, reference is made to U.S. Pat. Nos. 3,454,939; 3,460,116; 3,506,975; and 3,516,077. These patents describe various propagation means and magnetic bubble domain devices.

At present, three general techniques have been described for sensing of magnetic bubble domains. These are inductive sensing, Hall effect sensing, and magneto-optical sensing. In inductive sensing, the flux change occurring in a conductive loop when a bubble passes thereby is noted. Generally, the bubble is first expanded and then collapsed in the presence of the sense loop in order to provide a greater output voltage. An example of this type of sensing is presented in U.S. Pat. No. 3,508,222.

Generally, inductive sensing is disadvantageous because it requires a significant amount of space (bubble domains usually have to be expanded before collapsing in order to provide a sufficient output signal). This means that space which could be used for storage and logic must be provided for bubble expansion. Another problem associated with inductive sensing is related to the speed of sensing. Since the bubble domains usually have to be expanded before a flux change is sensed upon collapse of the bubble domain, the total sensing time is large. Further, the use of sense loops is not fully compatible with all propagation circuitry means. For instance, in the use of permalloy patterns, the provision of additional inductive sensing loops means extra fabrication steps and bubble expansion requires additional drive currents.

Hall effect sensing requires use of an adjacent semiconductor chip whose Hall voltage, developed as a result of the flux in the bubble domain, is sensed. Here, there is a fabrication difficulty since the semiconductor chip must be aligned properly with respect to a propagation direction of the bubble domain and at least four contacts must be attached to the semiconductor chip. Another difficulty with Hall effect sensing techniques is that these techniques have small conversion efficiency for many semiconductor materials. That is, a large amount of input power is required to obtain a usable output signal. In particular, the well developed silicon technology does not offer high mobility or high conversion efficiency.

Magneto-optical sensing utilizes light sources and polarizers to create a polarized beam of light which is incident upon the magnetic sheet containing the bubble domains. The bubble domains have a magnetization direction and therefore affect the plane of polarization of the light as it travels through the bubble domain or is reflected therefrom. Either the Kerr effect (reflected light) or the Faraday effect (transmitted light) can be used to visibly detect the presence or absence of bubble domains. However, additional equipment, such as light sources, analyzers, polarizers, and photosensors are required to utilize this method. The speed obtainable in magneto-optical sensing depends upon the particular photodetector used. Here, there is a balance between the magnitude of the output signal required and the response time of the photodetector. A large photodetector may be required in order to achieve large signal outputs but this in turn may lead to slow response times. Further, the conversion efficiency of magneto-optical sensing systems is not high.

In addition to the considerations discussed above with respect to prior art sensing techniques, it is desirable to provide all functions on the magnetic sheet in which the bubble domains exist. That is, it is desirable to provide memory, logic, propagation, and readout entirely on the magnetic sheet. In this way, a fully integrated system can be created having improved size and speed performance as well as a minimum number of interconnections. As is apparent from a review of the previous paragraphs, completely integrated (on-chip) systems are not possible when the prior art sensing methods are used. Accordingly, it is a primary object of this invention to provide a sensing system for magnetic bubble domains which can be integrated with all known bubble domain propagation circuitry.

It is another object of this invention to provide a magneto-resistive sensing system for bubble domain detection.

It is still another object of this invention to provide a magneto-resistive sensor for detection of bubble domains which utilizes a minimum of space and is easy to fabricate on the magnetic sheet housing the bubble domains.

A further object of this invention is to provide a magneto-resistive sensor which senses the presence of bubble domains rapidly.

A still further object of this invention is to provide a magneto-resistive sensor for detection of bubble domains which has a high conversion efficiency.

Another object of this invention is to provide a magneto-resistive sensing system for detection of bubble domains which utilizes the propagation circuitry already present on the magnetic sheet.

SUMMARY OF THE INVENTION

This magneto-resistive sensing system is generally located on the magnetic sheet on which the bubble domains exist. In a preferred embodiment, it is integrated into the propagation circuitry used to drive the bubble domains across the magnetic sheet. A source for providing current flow through the sensing element is provided and the leads which connect this source to the sensing element are deposited on the magnetic sheet or on the propagation circuitry. Current or voltage changes are used to detect the presence or absence of a bubble domain.

When a bubble domain passes in proximity to the sensing element, the magnetization of the element is switched to a direction transverse to its initial direction. This causes a change in resistance of the sensing element and this resistance change is sensed as either a current or a voltage change. Consequently, the presence of a bubble domain will cause a current or voltage change, while the absence of a domain will not cause a current or voltage change. While it is generally preferred to sense the resistance change of the sensing element as a voltage or current change, it is within the scope of this invention to do so in any other way.

In a preferred embodiment, the magneto-resistive sensing element is a permalloy strip which also constitutes part of the propagation circuitry needed to move the bubble domain. In this case, the conductor leads which attach the current source to the sensing element are deposited directly on the propagation circuitry. Consequently, an integrated device is obtained. As will be apparent from the drawing, this sensing element can be used with all known types of propagation circuitry and can be fabricated in an integrated circuit manner with these different types of propagation means.

Although magneto-resistive sensing of magnetic domains is known (U.S. Pat. No. 3,493,694 and R. Spain and M. Marino, invited paper 1.4 "Magnetic Film Domain Wall Motion Devices," International Magnetic Conference (INTERMAG), Washington D.C., Apr. 21–24, 1970 sponsored by the Magnetics Group of the IEEE.), such techniques have never been applied to magnetic bubble domains. Also, it has not been taught how to integrate the sensor on the magnetic sheet in which the bubble domains exist. This invention proposes the use of magneto-resistive sensing and applies this type of sensing to provide a magnetic bubble domain system which is integrated on a single magnetic sheet and which does not require additional circuitry or hardware to achieve the magnetic readout function.

The foregoing and other objects, features, and advantages of the invention will be apparent from the following more particular description of the preferred embodiments of the invention as illustrated in the accompanying drawings.

DESCRIPTION OF THE PREFERRED EMBODIMENTS

Figure 1:
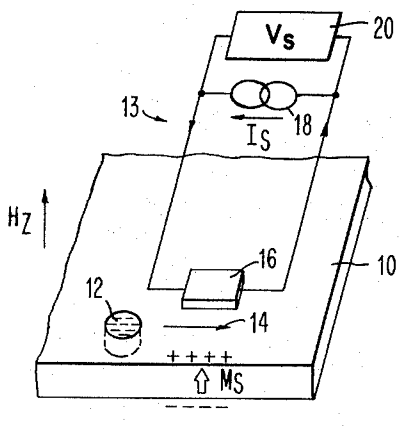
FIG. 1 is a schematic diagram showing a basic magneto-resistive sensing technique where the sensing element is located on the magnetic sheet in which the bubble domain propagates.

FIG. 1 depicts a magneto-resistive sensing device located on the magnetic sheet in which bubble domains propagate. In more detail, magnetic sheet 10 (such as orthoferrite or garnet), has a bias magnetic field $H_z$ normal to the plane of the sheet. This bias field provides the stabilization of magnetic bubble domains 12 which have a magnetization opposite to that of the magnetization $M_s$ of the magnetic sheet. The bias field $H_z$ may be unnecessary if the orthoferrite sheets are fabricated so that their surfaces are permanently magnetized normal to the magnetic sheet and exchange coupled to the body of the sheet, as taught in U.S. Pat. No. 3,529,303. The domains are initially produced in the magnetic sheet by known means, such as those described in the aforementioned references. Under the influence of various propagation means (not shown in FIG. 1), the bubble domains 12 propagate in the direction of arrow 14.

The sensing system 13 comprises a magneto-resistive sensing element 16 and a current source 18 connected thereto. In the example shown, source 18 is a constant current generator which provides a constant measuring current $I_s$ through the sensing element 16. A constant current source is not necessary to the operation of this invention, but it makes domain sensing more easy than otherwise. The voltage developed across the sensing element as the result of the current flow therethrough is denoted $V_s$ and is measured by meter 20. This voltage is indicative of the presence or absence of a bubble domain in close proximity to the sensing element 16.

The sensing element 16 is usually fabricated with an easy axis of magnetization in a certain direction, and the current flow $I_s$ is usually along the easy direction, although it need not be in this direction. In the absence of a driving magnetic field, the magnetization M of the sensing element is along the easy axis also. That is, in the absence of an in-plane magnetic field due to the bubble domain or the propagation field, M is along the easy axis. For convenience $I_s$ is also directed along the easy axis.

The sensing element 16 is comprised of a material which exhibits a magneto-resistive effect. Many such materials are known, and a very suitable one is permalloy. The permalloy film can be polycrystalline and is a thin uniaxial permalloy film. The geometry and material parameters of permalloy are chosen so that the permalloy magnetization M will rotate 90° from the easy axis into the hard axis while a bubble domain passes and returns to the easy axis after the bubble domain is gone. Generally, the following design criteria are used to make a suitable magneto-resistive sensor:

1. The sum of the anisotropy field $H_k$ and the demagnetizing field along the hard axis of the permalloy (sensing element) must be less than the stray field from the bubble domain. That is, the bubble must be able to drive the sensing element 16.

2. The sensing element resistance should be at least about 50 ohms to allow matching to existing semiconductor sense amplifier inputs. Of course, the sensing element resistance is arbitrary, but matching it to the sense amplifier to be used provides greater power transfer.

3. The length of the sensing element along the direction of flow of the measuring current $I_s$ should not exceed the bubble diameter. This insures that all portions of the sensing element will have their magnetization switched so that the change in resistance $\Delta R/R$ will be maximized.

4. The sensing element cannot be much thinner than 200A or "size effects" will occur and the resistance change ratio $\Delta R/R$ will decrease. That is, the resistivity of very thin films increases when the thickness becomes less that the mean free path of the conduction electrons, as is apparent by referring to an article entitled "-Compositional and Thickness Dependence of the Ferromagnetic Anisotropy in Resistance of Iron-Nickel Films," by E. N. Mitchell et al., Journal of Applied Physics, Vol. 35, pp. 2604–2608, Sept. 1964.

5. The stray field from the magneto-resistive sensing element and from the bias current $I_s$ within the sensing element should not influence the bubble domain propagation. This means that thin sensing elements and small measuring currents should be used.

The same reference numerals will be used throughout the specification, whenever possible.

In addition to the fact that other materials than permalloy can be used for the magneto-resistive sensing element, it is possible to use other properties than the magneto-resistance. For instance, the presence or absence of bubble domains may be sensed by magneto-optic effects in which light is incident on the sensing element, magneto-strictive properties, magneto-caloric properties, and other effects. Whatever the particular property used, it is possible to incorporate the sensing element in the propagation means which is used to move the domains in the magnetic sheet. Making the sensing element part of the propagation means is advantageous, since it saves space and fabrication steps, and insures that the bubble domains will be sufficiently close to the sensing element to affect the properties of the element.

It should be noted that relative motion between the sensing element and the bubble domains is not required for sensing to occur (in contrast with other sensing techniques, such as inductive sensing). It is only necessary that the magnetic field associated with the bubble domain sufficiently affect the property of the sensing element which is to be used.

Figure 2A:
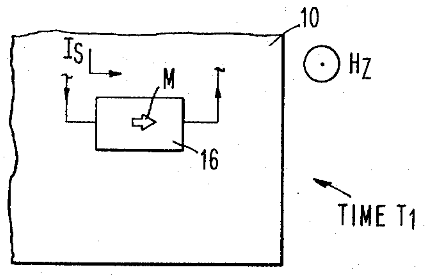
FIGS. 2A–2B show the magnetization M of the sensing element at time $T_1$ corresponding to the absence of bubble domain and at time $T_2$ corresponding to the presence of a bubble domain, respectively.
Figure 2B:
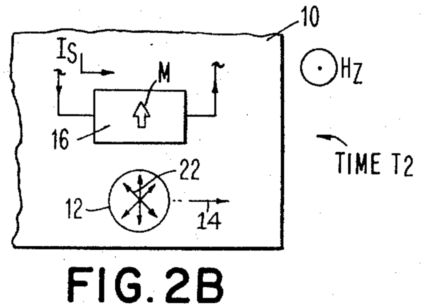
Figure 2C:
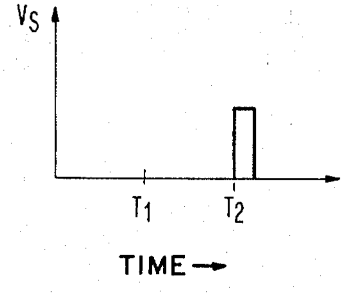
FIG. 2C shows a graph of output signal $V_s$ as a function of time for the two situations of FIGS. 2A and 2B.

FIGS. 2A–2C illustrate schematically the operation of the magneto-resistive sensor in the absence and presence of a bubble domain. In these figures only the sensing element 16 is shown, for ease of explanation.

In FIG. 2A, the magnetization M of the sensing element 16 is along the direction of measuring current $I_s$ in this element. This is the situation at time $T_1$.

In FIG. 2B, a bubble domain 12 is passing the sensing element at time $T_2$. The magnetic flux emanating from bubble domain 12 (indicated by radially extending arrows 22) causes the magnetization M to rotate to a direction normal to its direction at time $T_1$. Consequently, the resistance of the magneto-resistive element 16 will change and a different corresponding voltage will develop across the sensing element. This voltage $V_s$ is depicted in FIG. 2C, in which a voltage output at time $T_2$ indicates the presence of a bubble domain 12 while the absence of a voltage output at time $T_1$ indicates the absence of a bubble domain.

Figure 3A:
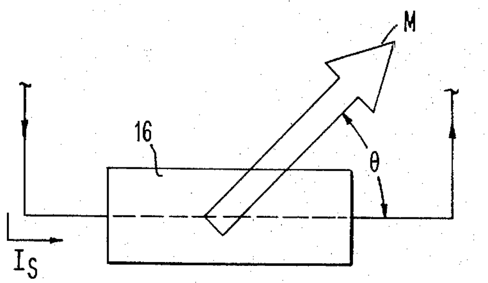
FIG. 3A shows a schematic representation of the magnetization vector M of the sensing element rotated through an angle $\theta$ with respect to the direction of current flow through the sensing element.
Figure 3B:
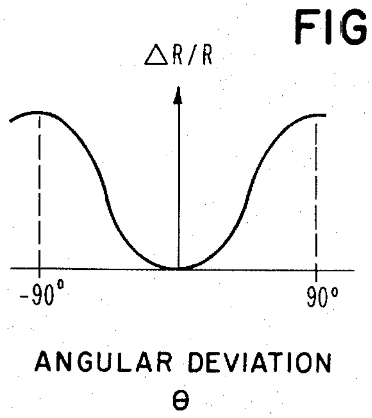
FIG. 3B is a normalized graph of the change in resistance $\Delta R$ of the sensing element plotted against the angle $\theta$ of rotation of the magnetization vector of the sensing element.

FIGS. 3A and 3B show the change in resistance $\Delta R$ of the magneto-resistive sensing element as a function of the angle $\theta$ of rotation of the magnetization vector M of the sensing element. In FIG. 3A, only the sensing element 16 is shown. The magnetization vector M of the sensing element makes an angle $\theta$ with respect to the direction of the measuring current $I_s$ through the sensing element.

In FIG. 3B, the resistance change $\Delta R/R$ is plotted as a function of the angular deviation $\theta$ of the magnetization vector M from the direction defined by the direction of a measuring current $I_s$ through the sensing element. Resistance R is the resistance of sensing element 16 when the vector M is along the direction of the measuring current $I_s$. The change in this resistance is $\Delta R$ which is dependent on the angle $\theta$. From this graph, it is readily apparent that the sensing element is positioned with respect to the propagation direction of the bubble domain so that the flux associated with the stray magnetic field of the bubble domain will have a maximum effect on the sensing element. It is desirable that the magnetization vector M be rotated through an angle $\theta = 90°$ in order to produce a maximum change of resistance of sensing element 16 and therefore a maximum output signal $V_s$. In general, the sensing element is located such that a magnetic field large enough to drive the sensing element will be present across the element.

Figure 4A:
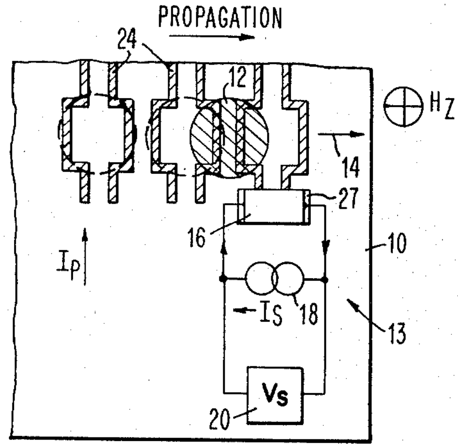
FIG. 4A shows a conductor loop propagation circuit integrated with a magneto-resistive sensing element for detection of magnetic bubbles.

FIG. 4A shows the magneto-resistive sensing system 13 used in combination with propagation circuitry which is comprised of conducting loops 24. The conducting loops are deposited on the magnetic sheet 10 in which bubble domains 12 exist. Under the influence of localized magnetic fields established by propagation currents such as $I_p$, the bubble domains will propagate in the direction of the arrow 14. As is the case in FIG. 1, bias magnetic field $H_z$ is applied normal to the plane of magnetic sheet 10.

Located on the same side of the magnetic sheet 10 as the conductor loops 24 is the magneto-resistance sensing element 16. This element is insulated from the conducting loops 24 by insulating layer 27 (FIG. 4B) so that current flow through the conducting loops 24 will not be affected. An explanation of a conductor loop propagation technique is contained in an article by A.H. Bobeck et al., entitled "Application of Orthoferrites to Domain Wall Devices," which appears in IEEE Transactions on Magnetics, Vol. MAG-5, No. 3, September 1969, at page 544. If desired, the sensing element could be located on the opposite side of magnetic sheet 10, in which case the insulation between the sensing element 16 and the conductor loops 24 would not be necessary.

Connected across the sensing element 16 is a current source, such as a constant current source 18 which produces current $I_5$ flowing through the sensing element in the direction of propagation of the bubble domain 12. The voltage $V_s$ developed across the sensing element is a function of the presence and absence of a bubble domain in its vicinity, as explained with reference to FIGS. 2A–2C and FIGS. 3A and 3B. This voltage is detected by detector means 20.

Figure 4B:
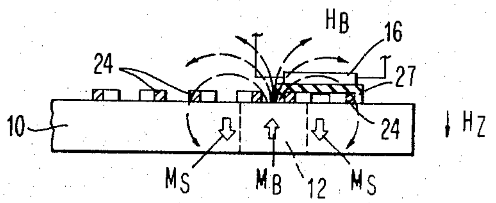
FIG. 4B shows a side view of the integrated structure of FIG. 4A.

FIG. 4B is a side sectional view of the structure of FIG. 4A., which shows the stray magnetic field $H_B$ of the bubble domain 12. As is apparent from this figure, the magnetization $M_B$ of the bubble domain 12 is oppositely directed from the magnetization $M_s$ of the magnetic sheet 10. When the bubble domain passes sensing element 16, portions of the magnetic field $H_B$ enter the sensing element and cause the magnetization M of element 16 to be rotated. This results in an output signal $V_s$.

Figure 4C:
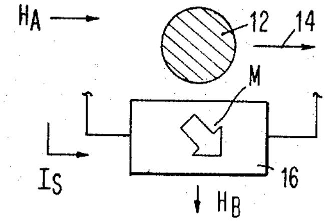
FIG. 4C shows a magnetic field diagram for a bubble domain passing the sensing element of FIG. 4A.

In FIG. 4C, the bubble domain 12 is passing the sensing element 16 whose magnetization vector M is in the direction of current flow $I_s$ through the sensing element. As is apparent, the direction of the positive gradient $H_a$ of the magnetic field produced by the loops 24 is largely along the direction of current flow in the sensing element. However, the field $H_B$ which interacts with the sensing element 16 is transverse to this current flow. Consequently, the magnetization vector M will be rotated toward the direction of the field $H_B$.

Figure 5A:
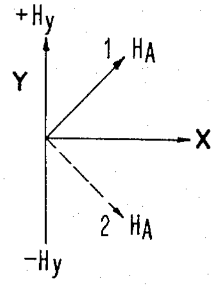
FIG. 5A shows the applied magnetic field sequence for a herringbone propagation circuit as shown in FIG. 5B, where the magneto-resistive sensing element is integrated in the propagation circuitry.
Figure 5B:
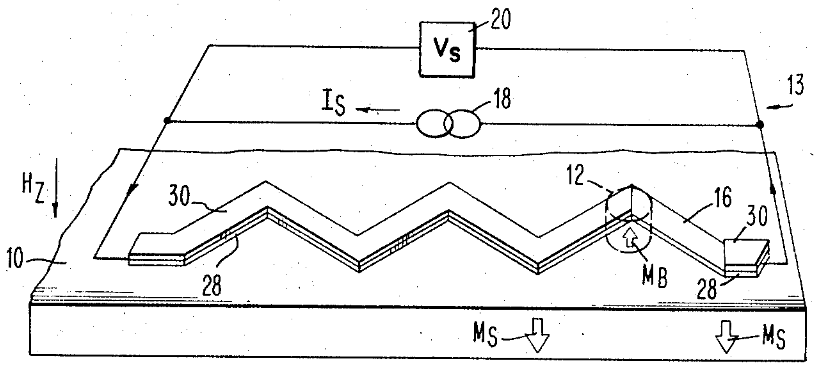

FIGS. 5A and 5B show an integrated propagation circuit-readout device in which the magneto-resistive sensing system 13 is a portion of the propagation circuitry. In more detail, a herringbone permalloy drive circuit 28 is used to move bubble domains 12 through the magnetic sheet 10. This drive means is a zig-zag line of permalloy 28 deposited directly onto the magnetic sheet 10. Bubble domains propagate in the positive X direction along the permalloy pattern in response to applied magnetic fields $H_a$ along directions 1 and 2, as shown in FIG. 5A. These magnetic field pulses can be provided by external bias coils which produce a D.C. magnetic field $H_x$ and an A.C. magnetic field $H_y$. As in the other embodiments, a bias field $H_z$ normal to the plane of magnetic sheet 10 is provided for maintaining the cylindrical bubble domains.

Conductor leads 30 are located on the permalloy pattern 28, and connect sensing element 16 to current source 18. Source 18 provides constant measuring current $I_s$ in element 16. Changes in resistance of element 16 are manifested as voltage changes in detection means 20, as explained previously.

The permalloy zig-zag pattern 28 is formed on the surface of magnetic sheet 10 by conventional methods. For example, a uniform layer of permalloy of about 250A is deposited on the magnetic sheet. A uniform layer of photoresist is then deposited on the permalloy layer. The photoresist is then exposed and developed, leaving photoresist over the permalloy only where the sensing element is eventually to appear. A good conductor (such as copper) is then electroplated onto the exposed permalloy. The conductor will not plate onto the photoresist but will adhere to the permalloy. The photoresist is then removed, leaving magnetic sheet 10 with a uniform first layer of permalloy and a second layer of conductor except where the photoresist was left and where the sensing element is eventually to appear. The entire surface is then recoated with another uniform layer of photoresist, which is exposed through a mask corresponding to a zig-zag pattern. After development and removal of the unexposed portion of the photoresist, the exposed metal layers are etched away, leaving a structure which is comprised of a zig-zag permalloy pattern 28 and a zig-zag conductor pattern 30 which overlies the permalloy everywhere except in the location of the sensing element 16 (FIG. 5B).

Any suitable conductor can be used for the electrode leads, although copper is a particularly good example. Generally, it is desirable to have the resistance of the sensing system 13 concentrated in the sensing element 16, rather than in the conductor leads 30. This will provide a maximum signal-to-noise ratio when the resistance of the sensing element is changed due to the presence of a bubble domain. Conductor materials are chosen to be those which have good electrical conductivity and which do not affect the magnetic properties of the propagation means 28 or the sensing element 16.

As in all embodiments, it is important that the magnetic field used for propagation of the bubble domains does not adversely influence the magneto-resistive sensing element. It is desirable that the sensing element be switched by the stray field associated with the bubble domain, so that a maximum effect can be attributed to the bubble domain. Referring to FIGS. 5A and 5B, the magnetic propagation field is along direction 2 when the bubble domain moves across sensing element 16. This means that the only magnetic field transverse to the length of the sensing element (i.e., transverse to the direction of the easy axis and the current flow $I_s$) is that due to the bubble domain. Consequently, the output signal $V_s$ will be entirely due to the bubble domain.

Figure 6A:
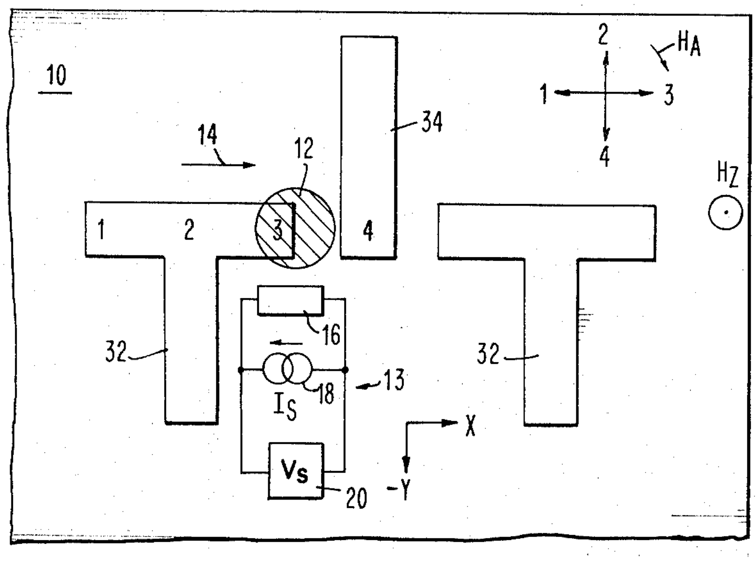
FIG. 6A shows a T and I-bar propagation circuit having a magneto-resistive sensing element integrated on the same magnetic sheet.

FIG. 6A shows a permalloy T and I bar configuration used in combination with a magneto-resistive sensing system 13. In this configuration, the bubble domain 12 will arrive beside sensing element 16 at a portion of the magnetic drive cycle when the magnetic drive field $H_A$ is along the easy axis (direction of $I_s$) of the sensing element 16 (position 1).

Permalloy T and I bar propagation circuitry is well known in magnetic bubble domain devices. For instance, such circuitry is described in the above mentioned article "Application of Orthoferrites to Domain Wall Devices" by A.H. Bobeck et al. Due to the rotating in-plane magnetic field $H_A$, attractive poles are formed along the extremities of the T bars 32 and I bars 34 depending upon the direction of the rotating inplane field $H_A$. These attractive poles cause the bubble domain 12 to propagate through the magnetic sheet 10 on which the permalloy T and I bars are located. For instance, the magnetic bubble domain 12 in FIG. 6A will propagate in the X direction (arrow 14) in response to the rotation of magnetic field $H_A$ in a clockwise direction as shown in that FIG. 6A.

A bias magnetic field $H_Z$ is directed normal to the plane of magnetic sheet 10, as described previously. Located on the magnetic sheet 10 and in close proximity to the T and I bar propagation means is a magnetoresistive sensing element 16. A constant current source 18 is attached to sensing element 16, and provides a constant current $I_s$ therethrough. Detection means 20 (such as a voltmeter, oscilloscope, etc.) connected across sensing element 16 detects resistance changes of element 16 caused by the passage of bubble domains 12 whose stray fields link sensing element 16. These resistance changes are sensed as an output voltage $V_s$.

Figure 6C:
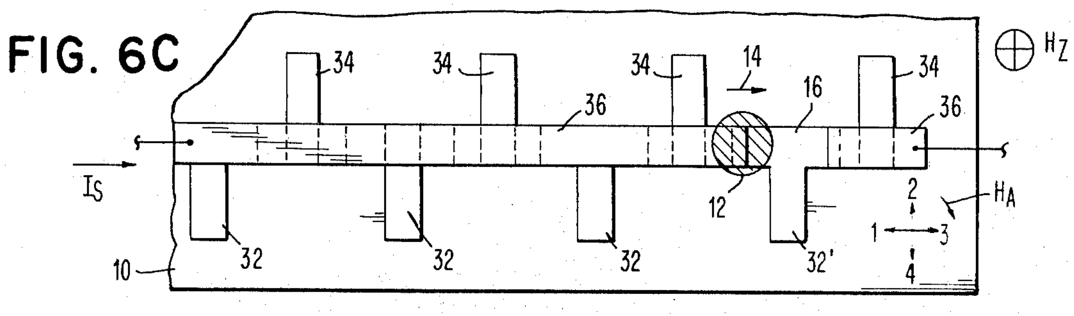
FIG. 6C shows a top view of an alternate embodiment of an integrated structure combining T and I-bar propagation circuitry and the magneto-resistive sensing element, where the sensing element is a portion of the propagation circuitry.
Figure 6D:
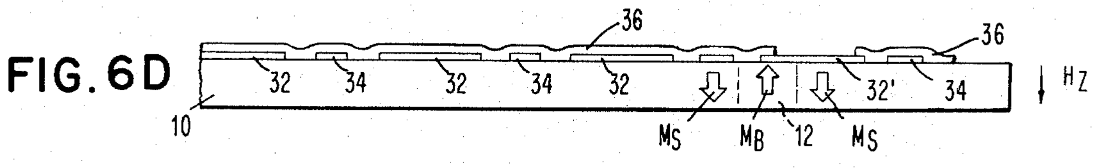
FIG. 6D shows a side cross-sectional view of the integrated structure of FIG. 6C.
Figure 6B:
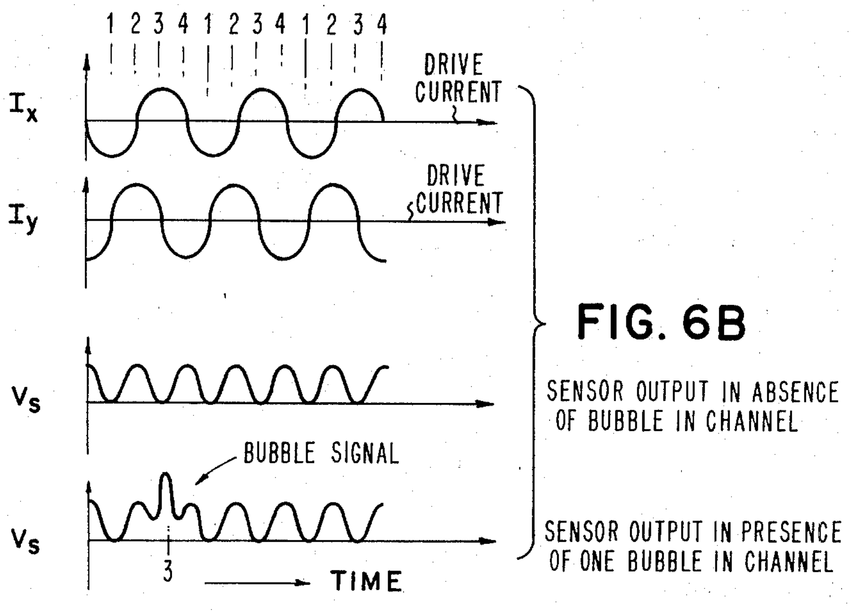
FIG. 6B shows graphs of drive current and sensing element output in the absence/presence of a bubble domain, for the structure of FIG. 6A.

FIG. 6B shows various plots of drive current $I_x$, $I_y$ versus time and sensor output versus time for the structure of FIG. 6A. As is apparent, the X and Y drive currents, $I_x$ and $I_y$, respectively, are sinusoidal currents which are 90° out of phase with the respect to one another. These currents drive the coils which produce the rotating propagation field $H_A$. A voltage output $V_s$ may develop across the sensing element 16 even when a bubble domain is not present in the propagation channel; however, a different signal appears when a bubble domain is present than when no bubble domain is present. For the arrangement shown in FIG. 6A, the bubble domain passes the sensing element while the applied magnetic field $H_A$ is in position 3. There is no signal in the absence of a bubble domain, as is apparent from FIG. 6B.

In FIG. 6C, the magneto-resistive sensing element 16 is a portion of the propagation circuitry comprising T-bars 32 and I-bars 34. This embodiment is similar to that shown in FIGS. 5B and 5C, in that sensing element 16 is a portion of the propagation circuitry. Although the drive field $H_A$ has a large adverse effect on the sensing element (it tends to saturate it), this effect will occur at different times than the effect due to bubble domain flux. Sensing can occur between saturation pulses or the bubble domain can be used to take element 16 out of saturation when sensing. Although they are not shown in FIG. 6B, a constant current source and detecting means are provided for the structure of FIG. 6B, in the same manner as they are present in FIG. 6A.

In more detail, the sensing element 16 is a portion of T-bar 32' to which conductor leads 36 are attached. These leads are electrodes deposited directly on the propagation circuitry and are thick enough to ensure that their resistance will be negligible compared to that of the sensing element. The same type of fabrication sequence as was used for the structure of FIG. 5B can be used here.

FIG. 6D shows a side cross-sectional view of the structure of FIG. 6C, in which the conductor electrodes 36 are more easily seen. The bubble domain 12 is characterized by a magnetization $M_B$ oppositely directed to the magnetization $M_S$ of magnetic sheet 10.

Figure 7A:
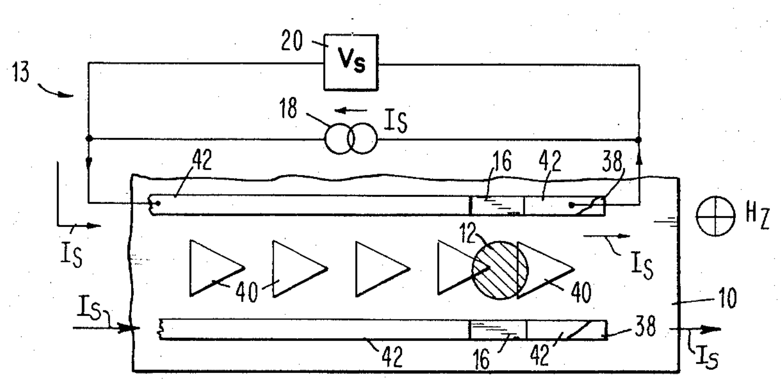
FIGS. 7A and 7B show a top view and a side view, respectively, of an integrated structure combining an angelfish propagation circuit and a magneto-resistive sensor, where the sensing element is a portion of the propagation means.
Figure 7B:
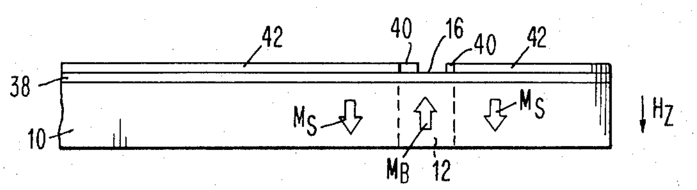

FIGS. 7A and 7B show an integrated combination of an angelfish propagation means and a magneto-resistive sensing element. Here, the sensing element 16 is a portion of each permalloy guide rail 38 used in the propagation means. Again, reference can be made to the above-mentioned Bobeck et al. article entitled "Application of Orthoferrites to Domain Wall Devices" for further explanation of angelfish propagation circuitry.

In FIG. 7A, a top view of a magnetic sheet 10, on which angelfish permalloy patterns have been deposited, is shown. Propagation by this means utilizes the fact that a bubble domain 12 can be modulated in size by increasing or decreasing the bias field $H_Z$. Propagation is achieved by moving the pulsating bubble domain into and out of asymmetrical energy traps. The energy traps are formed by the wedge-shaped films 40 of permalloy having high permeability. Since the bubble domains assume a position on a permalloy wedge where the magneto-static energy is minimized, bubble domains are more easily moved off the point of a wedge rather than the blunt end of the wedge. Consequently, domains 12 can be propagated (in the direction indicated by arrow 14) along a series of permalloy wedges by means of a periodic modulation of the diameter of the bubble domain. When in the expansion phase, the leading bubble domain wall extends out to overlap the blunt edge of the next permalloy wedge. When being contracted, the trailing bubble domain wall slides off the point of the wedge that previously held it.

Permalloy guide rails 38 are also deposited on magnetic sheet 10. These guide rails provide lateral stability to the bubble domains as they travel from one wedge to another. The guide rails insure that the bubble domains expand and contract along the direction of motion rather than across it.

In FIG. 7A, portions of the permalloy guide rails 38 are used for the magneto-resistive sensing elements 16. Either one or two sensing elements can be used, although the use of two such elements will provide additional output signal strength. Also, it is possible to use a portion of a permalloy wedge as the sensing element, although the use of the rails is most convenient. The conductor leads 42 to sensing elements 16 are provided by a metal deposition onto the permalloy rails. The electrode deposition has the same width as the permalloy guide rails and is usually about the same thickness. If a metal of good conductivity, such as copper is used for the electrodes 42, the electrodes will electrically shunt the underlying permalloy layer. This insures that only the short section of exposed permalloy which is to be used as the magneto-resistive sensing element 16 will contribute to the measured magneto-resistive effect.

What has been shown in an integrated system for magnetic bubble domains comprising propagation circuitry and sensing devices. In many cases, the propagation circuitry can be used as the sensing element in order to provide greater cost and density savings. Further, this integrated structure is not adversely affected by the propagation fields used to drive the bubble domains. Whereas the prior art did not approach the problem of magnetic bubble domain sensing from the standpoint of a completely integrated, on-sheet device, the present invention serves to provide such an integrated structure.

As will be apparent to those of skill in the art, various modifications may be made to the structures shown here without departing from the scope of the invention. For instance, many different materials may be used for the sensing element, and this element can be incorporated in various ways in the propagation circuitry, so long as the bubble domains will be able to switch the magnetization vector of this element.

What is claimed is:

1. An integrated structure for non-destructive sensing of a single-wall magnetic bubble domains, comprising:

a magnetic medium in which said single-wall bubble domains can be propagated;

propagation means located on said magnetic medium for moving said bubble domains to selected locations within said medium;

at least one magneto-resistive sensing element comprising a uniaxial crystal having an easy axis, said element being located near said magnetic medium for detecting the presence and absence of said bubble domains, said sensing element located with respect to said propagation means so that the magnetic flux associated with a bubble domain is sufficient to rotate the magnetization of said sensing element;

electrical means for providing electrical current to each of said magneto-resistive sensing elements; and detection means connected to said magneto-resistive sensing elements for sensing the rotation of said magnetization of said sensing elements.

2. The apparatus of claim 1, wherein said at least one sensing element is a single crystal.

3. The apparatus of claim 1, wherein said at least one sensing element has a length in the direction of said easy axis which is approximately the diameter of said bubble domain.

4. The apparatus of claim 3, wherein said current through said sensing element is along said easy axis.

5. The apparatus of claim 1, wherein said sensing elements comprise a portion of said propagation means.

6. The apparatus of claim 5, wherein said propagation means and said sensing elements are comprised of permalloy.

7. The apparatus of claim 5, wherein said sensing elements and said current sources are connected by leads which are located on said propagation means.

8. A magnetic bubble domain system in which said bubble domains can be non-destructively sensed, comprising:

a magnetic medium capable of supporting single wall cylindrical magnetic bubble domains;

magneto-resistive sensing means located adjacent said medium for detecting said bubble domains when the magnetic flux of said domains intercepts said sensing means, said magnetic flux being sufficient to change the resistance of said sensing means, wherein said sensing means comprises a magneto-resistive sensing element whose resistance depends upon the magnetic flux thereacross, said sensing elements having a length which is approximately equal to a bubble domain diameter, means for establishing current flow through said sensing element, and means to detect said resistance change of said sensing element.

9. A magnetic bubble domain system in which magnetic bubble domains are sensed, comprising:

a magnetic sheet in which in which said bubble domains exist, a magneto-resistive sensing element located in flux-coupling proximity to the stray magnetic field from said bubble domains, the resistance of said sensing element changing when said element is intercepted by the stray magnetic field of said bubble domains, electrical means for providing current through said magneto-resistive sensing element, detection means responsive to said resistance change of said magneto-resistive sensing element for detection of said bubble domains.

10. The system of claim 9, where said detection means and said electrical means are connected to said magneto-resistive sensing element at the same locations to define a two-terminal sensing device comprising said magneto-resistive sensing element, said electrical mean, and said detection means.

11. The system of claim 9, where said electrical means is a constant current source.

12. The system of claim 9, where said electrical means is a constant voltage source.

13. The system of claim 9, where said magneto-resistive sensing element has a length in the direction of current flow therethrough which is approximately the diameter of said bubble domain.

14. The system of claim 9, where said magneto-resistive sensing element is comprised of permalloy.

15. The system of claim 9, where said magnetoresistive sensing element has a thickness of approximately 200 angstroms.

16. The system of claim 9, where said magneto-resistive sensing element is a uniaxial crystal having an easy axis lying along the direction of current flow therethrough.

17. The system of claim 9, further including propagation means for moving said bubble domains into flux-coupling proximity to said magnetoresistive sensing element.

18. The system of claim 17, where said magneto-resistive element is a portion of said propagation means.

19. The system of claim 17, where said magneto-resistive sensing element and said propagation means are comprised of the same material.

20. The system of claim 19, where said propagation means and said magnetoresistive sensing elements are comprised of permalloy.

21. A magnetic bubble domain system comprising:

a magnetic sheet in which said bubble domains exist, at least one magnetoresistive sensing device located in flux-coupling proximity to the stray magnetic field associated with said bubble domains, said magnetoresistive sensing device providing an output indicative of a resistance change of said sensing device when a magnetic field intercepting it changes, said sensing device comprising:

a magneto-resistive sensing element whose resistance changes when the stray magnetic field of a bubble domain intercepts it, an electrical means for providing current through said element, a detection means responsive to said resistance change for providing an output indicative of the presence and absence of said bubble domains in flux-coupling proximity to said magneto-resistive sensing element, propagation means for moving said bubble domains into positions of flux-coupling proximity to said magneto-resistive sensing element.

22. The system of claim 21, where said sensing device is a two-terminal device requiring electrical connections only for said electrical means.

23. The system of claim 21, where said detection means and said electrical means are in parallel with said magnetoresistive sensing means.

24. The system of claim 21, where the length of said magneto-resistive element in a direction substantially transverse to the direction of the stray magnetic field from said bubble domains is approximately the diameter of said bubble domains.

25. The system of claim 21, where said mangeto-resistive sensing element is electrically contacted on only two faces thereof.

26. The system of claim 21, where said magneto-resistive sensing element is a portion of said propagation means.

27. The system of claim 21, wherein the direction of current in said magneto-resistive sensing element is along the magnetic easy axis of said element.

28. The system of claim 21, where said magneto-resistive sensing element and said propagation means are comprised of magnetically soft material.

29. The system of claim 28, where said material is permalloy.

* * * * *